Figure 1:
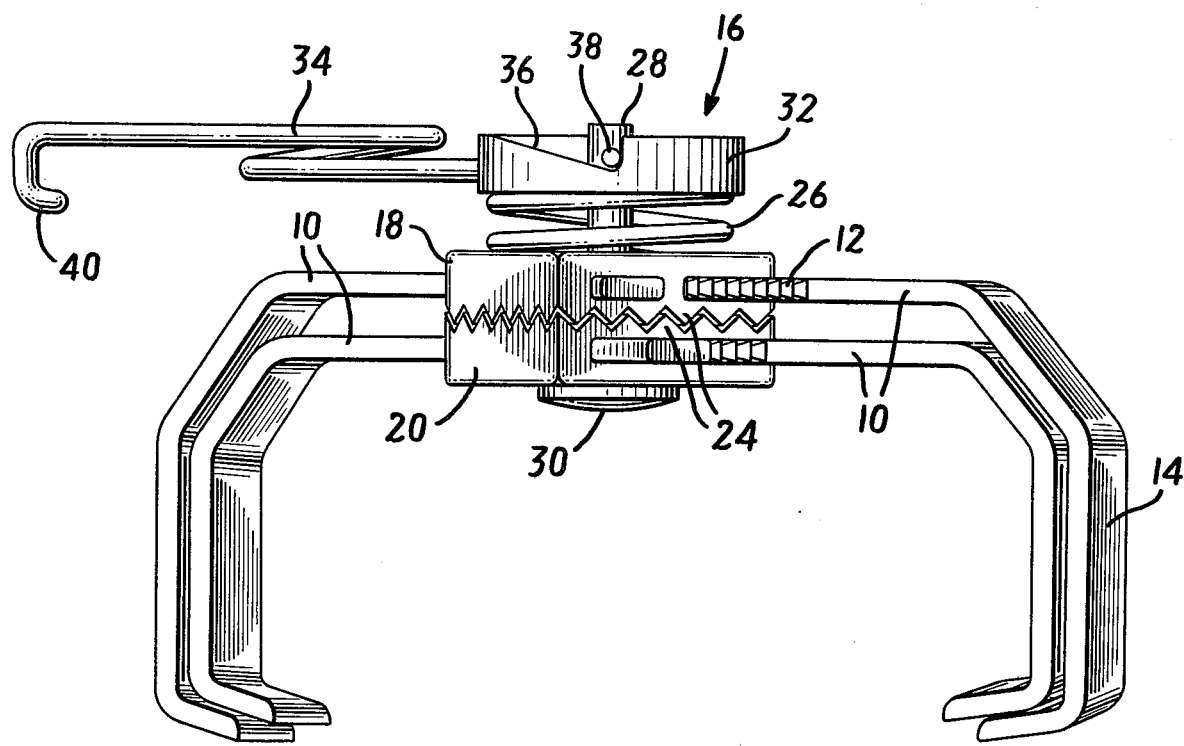

United States Patent [19]
Hyggen

[11] 3,891,018
[45] June 24, 1975

[54] GRIPPING SHOES FOR VEHICLE WHEELS
[75] Inventor: Egil Hyggen, Oslo, Norway
[73] Assignee: Elkem-Spigerverket A/S, Oslo, Norway
[22] Filed: Jan. 7, 1974
[21] Appl. No.: 431,314

[30] Foreign Application Priority Data
Jan. 11, 1973 Norway.................................. 121/73

[52] U.S. Cl.................................. 152/225; 152/217
[51] Int. Cl............................................. B60c 27/02
[58] Field of Search........................... 152/225–230, 152/217

[56] References Cited
UNITED STATES PATENTS

| | | | |
|---|---|---|---|
| 2,423,759 | 7/1947 | Edwards | 152/225 |
| 2,575,263 | 11/1951 | Eisenhauer, Sr. | 152/225 |
| 2,767,761 | 10/1956 | O'Higgins (A) | 152/225 |
| 2,873,783 | 2/1959 | O'Higgins(B) | 152/225 |
| 3,053,302 | 9/1962 | Bopst III | 152/226 |

*Primary Examiner*—Drayton E. Hoffman
*Attorney, Agent, or Firm*—Eyre, Mann & Lucas

[57] ABSTRACT

An apparatus for improving the traction of tires in snow, mud, ice and the like is disclosed. The apparatus comprises movable J-shaped members which grip a vehicle wheel and are held in place to provide the traction.

5 Claims, 2 Drawing Figures

GRIPPING SHOES FOR VEHICLE WHEELS

The present invention relates to a new and useful apparatus for improving the traction of vehicle wheels under adverse conditions such as snow, ice, mud and the like.

Devices for improving the traction of vehicle tires are well known in the art. One of the most common forms of traction improving devices is so called "tire chains" which are frequently used especially on snow and ice. The well known disadvantage of chains is that they are difficult to put on and remove. As a result they are frequently left on longer than they should be and this results in quick wear and snapping of the chains. Furthermore, it is usually necessary to jack-up the car in order to put on the tire chains, especially if the vehicle is stuck at the time the chains are put in place.

Other types of devices such as gripping shoes have been tried but to date these have not met with much success especially because of difficulty with affixing the members to more modern cars which have comparatively small wheel wells.

In accordance with the present invention there is provided a gripping shoe for vehicle wheels which can be readily attached and removed whereby its versatility is greatly increased. The gripping shoe comprises four or more J-shaped members which are toothed on their remote ends and come together in a central housing. The central housing comprises a toothed member for drawing in the J-shaped members and also means for locking the J-shaped members in position. In accordance with the present invention, the J-shaped members are collapsible towards each other by means of relatively moving housing members whereby easy storage of the gripping shoes is facilitated.

Figure 2:
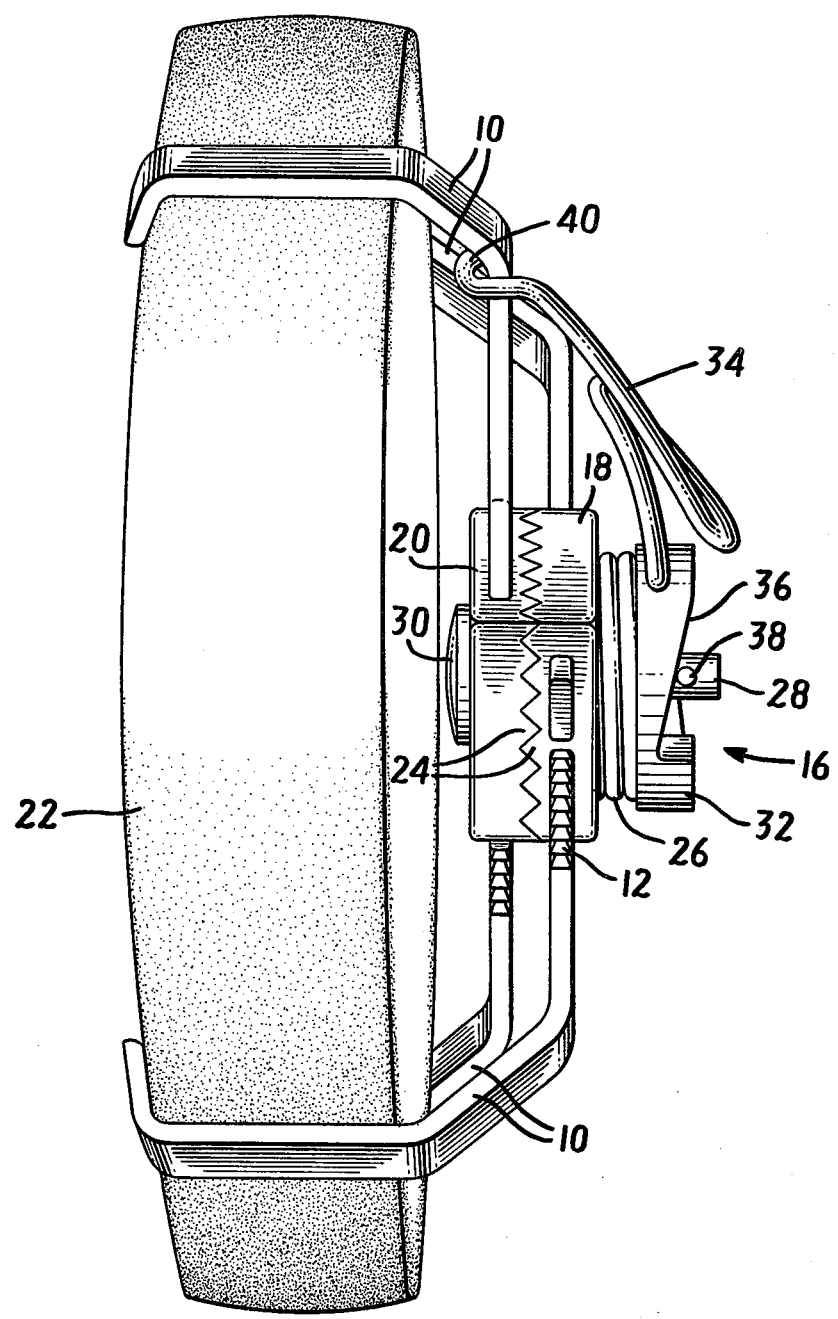

These and other aspects of the present invention may be more fully understood with respect to the drawings in which:

FIG. 1 shows the preferred embodiment of the gripping shoe of the present invention; and FIG. 2 shows the gripping shoe of FIG. 1 affixed to a vehicle wheel.

The preferred embodiment of the gripping shoe of the present invention comprises four J-shaped members 10 which have teeth 12 on the remote end from the hook end 14 of the J-shaped member 10. The toothed ends of the J-shaped members 10 are guided into a central housing 16. The central housing comprises two parts 18 and 20 which are rotatably movable with respect to each other. In this manner the J-shaped members can be kept in parallel alignment as shown in FIG. 1 for easy storage while, when in use, they can be rotated to a position where they will grip the tire as shown in FIG. 2. In the preferred embodiment of the invention, there are four J-shaped members, each member being at an angle normal to four J-shaped adjacent member. The two parts 18 and 20 which are normally rotatable in order to adjust the J-shaped members on the vehicle wheel 22 are provided with means for locking them in fixed position with respect to each other. In the preferred embodiment of the invention as shown, these means comprise radially extending grooves 24 which will keep the two housing members 18, 20 from rotating when compressive pressure is applied to the outside of the housing members.

In the embodiment shown, a helical spring 26 is provided for maintaining loose tension between the housing members 18 and 20 so that they will stay in set position when they are being applied. It will be well recognized that such a helical spring is not necessary and can either be replaced by other tensioning means or can be dispensed with entirely if desired. A bolt 28 with head 30 passes through the two housing members 18 and 20 and also through a cammed disc 32. The bolt 28 is provided with teeth (not shown) which engage the teeth 12 of the J-shaped member.

For operation the J-shaped members are pulled apart by hand force to a sufficient diameter to permit them to be placed over the wheel. They are then positioned at an angle of about 90° with respect to each adjacent J-shaped member and the spring 26 in cooperation with the grooves 24 will tend to maintain the J-shaped members in this pre-selected position. Lever arm 34 is then rotated in counter clockwise direction. Since lever arm 34 is connected to cammed disc 32 having an oblique surface 36, counter clockwise movement of the lever arm 34 will cause counter clockwise rotation of the bolt 28 through contact of pin 38 with oblique surface 36. Rotation of the toothed bolt will draw in the J-shaped members and the bolt 28 will continue to rotate until the J-shaped members 10 are snug against the tire 22 as shown in FIG. 2. Even though bolt 28 will now stop rotating, lever arm 34 is continued to be rotated in a counter clockwise direction to force the oblique surface 36 of the cammed disc 32 to travel under the pin 38 thereby causing a compressing together of the central housing members 18 and 20. When cammed disc 32 has compressed the central housing members 18 and 20 as much as it can by means of exerting force on pin 38, cammed disc 32 will also cease to rotate. Lever arm 34, made of a resilient material such as spring steel, is continued to be rotated until it is under sufficient tension to prevent cammed disc 32 from slipping. Lever arm 34 is then affixed to one of the J shaped members for example by hooking it under, employing hooked end 40 of the lever arm 34.

It will be understood that the claims are intended to cover all changes and modifications of the preferred embodiments of the invention, herein chosen for the purpose of illustration, which do not constitute departures from the spirit and scope of the invention.

What is claimed is:

1. A gripping shoe for vehicle wheels comprising:
    a. a central housing having at least two sections normally rotatable with respect to each other, said two sections having surfaces which face each other;
    b. at least two gripping members associated with each said housing, said gripping members being J-shaped and having their hooked ends remote from said central housing;
    c. means for drawing said gripping members together whereby they can be snugly drawn about a vehicle tire; and
    d. means for locking said housing members to prevent them from rotating with respect to each other said means including corresponding protrusions and depressions on said facing surfaces of the two sections of the housing.

2. The apparatus of claim 1 wherein the means for drawing the gripping shoes together comprises a toothed section of the gripping member and a cooperating toothed member in the central housing.

3. The apparatus of claim 1 wherein the means for locking said housing members comprises radially extending grooves in each of said housing members.

4. A gripping shoe for vehicle wheels comprising:
a. a central housing having at least two sections normally rotatable with respect to each other;
b. at least two gripping members associated with each said housing, said gripping members being J-shaped and having their hooked ends remote from said central housing;
c. means for drawing said gripping members together whereby they can be snugly drawn about a vehicle tire;
d. means for locking said housing members to prevent them from rotating with respect to each other; and
e. wherein said locking means further comprises a bolt passing through said housing members and means for drawing said housing members together along the longitudinal extent of the bolt.

5. The apparatus of claim 4 wherein the means for drawing said housing members together further comprises a cammed disc and a resilient lever arm affixed thereto.

* * * * *